United States Patent [19]
Rieber et al.

[11] Patent Number: 5,214,839
[45] Date of Patent: Jun. 1, 1993

[54] METHOD OF MAKING DYNAMOELECTRIC MACHINES INCLUDING METAL FILLED GLASS CLOTH SLOT CLOSURE WEDGES

[75] Inventors: John C. Rieber, Louisville; Jeffrey S. McCoy, Jeffersontown, both of Ky.

[73] Assignee: General Electric Company, Fort Wayne, Ind.

[21] Appl. No.: 945,007

[22] Filed: Sep. 15, 1992

Related U.S. Application Data

[60] Continuation of Ser. No. 836,474, Feb. 18, 1992, abandoned, which is a division of Ser. No. 354,061, May 19, 1989, Pat. No. 5,124,607.

[51] Int. Cl.$^5$ ............................................. H02K 15/10
[52] U.S. Cl. ...................................... 29/596; 310/214
[58] Field of Search ................... 29/596, 598; 310/214, 310/215, 43

[56] References Cited

U.S. PATENT DOCUMENTS

| | | |
|---|---|---|
| 872,324 | 12/1907 | Bergman . |
| 1,605,112 | 11/1926 | Huggins . |
| 1,684,255 | 9/1928 | Bergman ............................ 310/214 |
| 3,093,764 | 6/1963 | King et al. ......................... 310/214 |
| 3,447,009 | 5/1969 | Keuth et al. ....................... 310/214 |
| 3,976,902 | 8/1976 | Simmonds ......................... 310/214 |
| 4,427,970 | 1/1984 | Richter et al. .................... 310/214 |
| 4,761,581 | 8/1988 | Watanabe et al. ................ 310/214 |

FOREIGN PATENT DOCUMENTS

| | | |
|---|---|---|
| 339924 | 8/1965 | Fed. Rep. of Germany . |
| 1638239 | 7/1971 | Fed. Rep. of Germany . |
| 2136893 | 2/1973 | Fed. Rep. of Germany . |
| 3715242 | 11/1987 | Fed. Rep. of Germany . |
| 204364 | 11/1988 | Fed. Rep. of Germany . |
| 2147127 | 3/1973 | France . |
| 22549 | 3/1981 | Japan . |
| 092738 | 9/1984 | Japan . |
| 220039 | 4/1985 | Japan . |
| 630710 | 10/1978 | U.S.S.R. . |
| 668043 | 6/1979 | U.S.S.R. . |
| 936235 | 6/1982 | U.S.S.R. . |

Primary Examiner—Carl E. Hall
Attorney, Agent, or Firm—Ralph E. Krisher, Jr.

[57] ABSTRACT

A high permeability slot wedge for a dynamoelectric machine with the wedge configured as an elongated bar of uniform cross-sectional configuration formed of a ferromagnetic material having modestly good electrically insulative properties comprising approximately by weight 60% to 80% relatively small ferromagnetic particles such as powdered iron, about 10% reinforcing glass fabric; and 15% to 20% unsaturated thermosetting plastic resin binder such as a polyester resin is disclosed. The ferromagnetic material is homogeneously distributed throughout the thermosetting plastic binder so that the permeability and resistivity of the resulting wedge is substantially uniform throughout.

13 Claims, 5 Drawing Sheets

FIG_1

FIG_2

FIG_5

FIG_3A

FIG_3

FIG_9

FIG_10

FIG_11

METHOD OF MAKING DYNAMOELECTRIC MACHINES INCLUDING METAL FILLED GLASS CLOTH SLOT CLOSURE WEDGES

This is a continuation of copending application Ser. No. 07/836,474, filed Feb. 18, 1992, now abandoned which in turn was divisional of application Ser. No. 07/354,061 filed May 29, 1989 and now U.S. Pat. No. 5,124,607 granted Jun. 23, 1992.

The present invention relates generally to dynamoelectric machines and more particularly to such dynamoelectric machines having slot closure wedges and to a method of and apparatus for the manufacture of ferromagnetic laminate slot closure wedges.

Metal filled composite materials are known and typically employ a thermoplastic material such as one of several nylons (polyamide resins). Many types of molded plastic magnets, for example, employ a nylon binder. Nylons are thermoplastic materials and polymerization is catalyst initiated. Glass cloth with iron powder imbedded in an epoxy binder (polyether resin) is available commercially from United Technologies Corporation. Epoxy resins by comparison to thermoset polyester resins are more expensive and typically slower curing.

The absolute permeability of a material is the ratio of the magnetic flux density in a material to the magnetizing force inducing that flux, while the relative permeability of a material is the ratio of the absolute permeability of such material to that of free space. In either case, the permeability of a material is proportional to the ratio of the resulting flux to the magnetomotive force; and the reluctance (magnetic resistance) of a material is inversely proportional to its permeability. Air, mylar and most other electrical insulators have relative permeabilities near unity, and thus are also very poor magnetic conductors. There are numerous needs for electrically insulative materials having a high relative permeability, that is, materials which are electrical insulators yet good magnetic conductors.

In a dynamoelectric machine having a stator core with inwardly opening conductor slots, the slot opening (i.e., air spaces) between adjacent stator teeth is of a relatively high reluctance (low permeability) leading to reduced magnetic flux and a nonuniform magnetic field in the annular gap between the stator and adjacent rotor, the introduction of undesirable flux harmonics, and sometimes resulting in saturation of the stator tooth tips. It is well known as shown, for example, in U.S. Pat. No. 3,519,862 to provide bore or slot wedges of a low permeability insulating material such as paper or MYLAR to close the slot openings and insure that the winding segments remain within their individual slots. It is sometimes highly desirable to fill the gap between adjacent stator teeth with a ferromagnetic material, i.e., a material having a relative permeability significantly greater than one.

Electrically insulative ferromagnetic slot wedges have been long known. For example, in U.S. Pat. No. 1,605,112 high permeability slot closing strips are formed from ferrous or magnetizable metal woven strands and additional interwoven strands of insulating material all of which are imbedded in a phenolic condensation product and coated with an insulating varnish. Only the surface close to the stator bore is provided with the metal strands in this patented arrangement. U.S. Pat. Nos. 872,324 and 1,684,255 show rolled up iron or steel cloth which is then formed to a desired shape and permeated with an insulating material such as bakelite. The thus formed bore wedge is insulated from the core structure by a varnished paper or similar insulator. It is believed that the concentration of ferromagnetic material in these patented arrangements would be less than desired and the relative permeability thereof would be correspondingly low. In one currently used technique, electrically insulative ferromagnetic wedges are fabricated from a stack of steel punchings with a polyester resin surface layer molded about the punchings. These lastmentioned ferromagnetic slot or bore wedges perform their task well, but are relatively expensive to manufacture. Each of these three types of ferromagnetic wedge is heterogeneous in the sense that the resistivity as well as the magnetic permeability is not uniform throughout the wedge, but rather, abruptly changes at the metal-insulator interfaces. Moreover, within the metal portion, the resistivity is relatively low which may give rise to undesirable eddy current losses.

It would be highly desirable to obtain the benefits of a ferromagnetic slot wedge of a minimum preferred permeability while reducing the costs associated with such wedges, and to achieve higher concentrations of ferromagnetic material in such wedges than attainable by the iron strand or cloth techniques. It would also be highly desirable to retain the advantages of easy machinability exhibited by thermoplastics such as nylon while achieving the advantages of lower cost, rapid curing time, and inherently higher allowable service temperatures of cross-linked thermosetting plastics such as those exhibited by many polyester resins. Desirable polyester resins would contain double bonds which would allow cross-linking during polymerization, with such cross-linking giving them good high temperature properties.

One object of the present invention is to provide an improved dynamoelectric machine slot opening wedge.

Another object of the present invention is the provision of methods and processes for fabricating ferromagnetic laminates.

A further object of the present invention is the utilization of the technique of the previous object in the manufacture of ferromagnetic dynamoelectric machine slot wedges.

A composite slot closing wedge made in accordance with the techniques of the present invention exhibits homogeneity with, for example, a relative magnetic permeability in the range of 3 to 5 throughout. The material from which the slot closing wedges are made displays superior mechanical properties such as being easily machined to the desired configuration and finish which properties are very similar to those of TEXTOLITE, a well known phenolic impregnated linen material available from the Assignee herein.

Accordingly, it is a still further object of the present invention to provide a laminate material having good magnetic characteristics, excellent mechanical properties, ready machinability to close tolerances and to a smooth surface finish, and high dimensional stability.

Yet a still further object of the present invention is the provision of a ferromagnetic material having good electrical insulating properties.

Yet another object of the present invention is the utilization of the material of either of the previous two objects in the manufacture of ferromagnetic dynamoelectric machine slot wedges.

These as well as other objects and advantages features of the present invention will be in part apparent and in part pointed out hereinafter.

In one form of the invention, a dynamoelectric machine has a wound dynamoelectric machine stator core with a generally right circular cylindrical rotor receiving bore and a plurality of slots for receiving portions of electrical coils. There are access openings in the core where the slots communicate with the bore for facilitating placement of electrical coil portions in the slots. A rotor is journalled for rotation centrally within the bore and the electrical coils, when energized, create a magnetic field between the stator and the rotor. Slot closing wedges of uniform cross-sectional configuration along their respective lengths are positioned in the core to close the access openings subsequent to placement of the coil portions in the slots. Each of said slot closing wedges is formed from a magnetically conducting, electrically insulating composite material of substantially uniform relative magnetic permeability throughout the wedge. The slot closing wedges function not only to close the access openings, but also to enhance the uniformity of the magnetic field between the stator and the rotor.

In carrying out the present invention in another form thereof, we provide a method of manufacturing a ferromagnetic motor or generator stator or rotor slot spanning wedge and a wedge made according to such method. One preferred method includes mixing a powdered ferromagnetic material with an uncured unsaturated thermosetting resin to form a paste followed by impregnating a carrier fabric, such as glass cloth, with the paste. Preferably, the impregnated carrier fabric is then compression molded to form a preferred shape and the resin is polymerized or cured. In a more preferred form, the ferromagnetic material is powdered iron that comprises at least 75% by weight of the paste and the thermosetting resin is a polyester resin. Thereafter, the preferred process includes machining of the formed and polymerized shape and thus transforming the shape into an elongated bar having a generally uniform cross-sectional configuration.

In accordance with a further form of the invention, we provide a wound dynamoelectric machine core having a plurality of slots for receiving portions of electrical coils with access openings in the core for facilitating placement of electrical coil portions in the slots. Magnetically conducting, electrically insulating composite slot closing wedges function to close the access openings subsequent to placement of the coil portions in the slots. Each slot closing wedge is of substantially uniform relative magnetic permeability throughout the wedge with that relative magnetic permeability being in the range of about 3 to 5. The slot closing wedges are also of substantially uniform electrical resistivity throughout the wedge with that resistivity being at least two ohm-centimeters. The wedges may be formed from a ferromagnetic material that comprises approximately by weight at least 60% ferromagnetic particles having a preselected size range, about 10% reinforcing fabric and at most about 20% resinous binder. Preferably, the material comprises from 60% to 80% ferromagnetic particles and from 10% to 20% resinous binder. In one specific preferred form, the ferromagnetic particles comprise about 70% of the material.

In accordance with another aspect of the invention, a slot wedge for a dynamoelectric machine comprises an elongated bar of uniform cross-sectional configuration and homogeneous composition comprised of a ferromagnetic material, such as powdered iron, uniformly distributed in a cross-linked thermosetting plastic binder such as a polyester resin. Preferably, the relative magnetic permeability of the slot wedge is within a predetermined range of about 3 to 5 while the resistivity is at least two ohm-centimeters. The resistivity and relative permeability are relatively uniform throughout the slot wedge.

BRIEF DESCRIPTION OF THE DRAWING

Corresponding reference characters indicate corresponding parts throughout the several views of the drawing.

The exemplifications set out herein illustrate preferred embodiments of the invention in specific forms thereof and such exemplifications are not to be construed as limiting the scope of the disclosure or the scope of the invention in any manner.

DESCRIPTION OF THE PREFERRED EMBODIMENT

Figure 1:
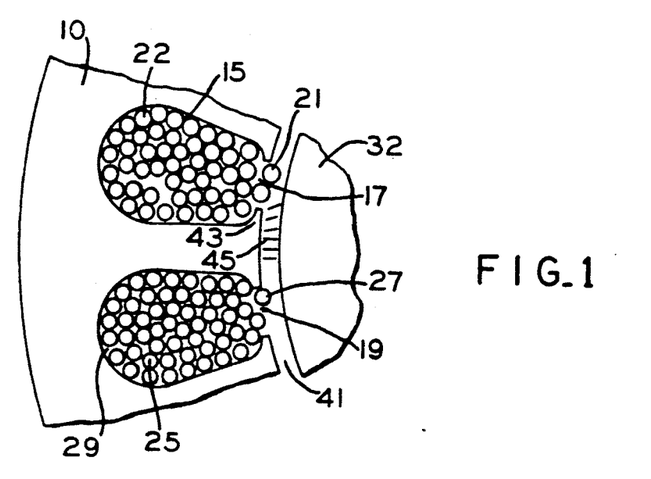
FIG. 1 is a view with parts removed, and parts in section, of a portion of a dynamoelectric machine having no slot wedges.
Figure 2:
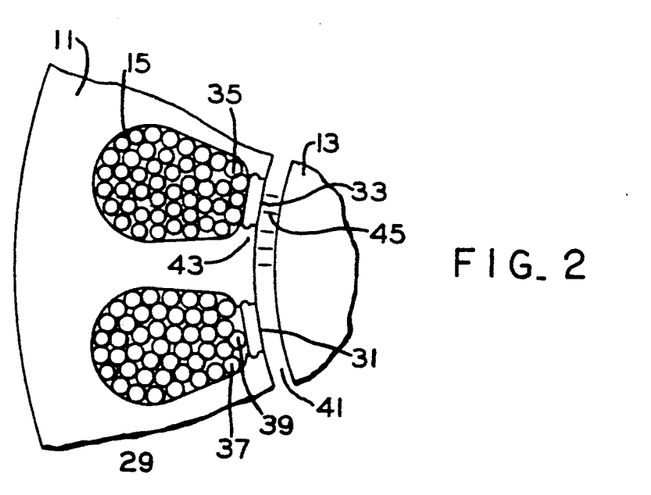
FIG. 2 is a view similar to FIG. 1 except that the machine includes slot wedges according to the present invention in one form thereof.

In FIGS. 1 and 2, end turn portions of the conventional stator windings have been cut away to better reveal the stator core slot configuration. In FIGS. 1 and 2, the stator cores 10 and 11 are formed from a stack of laminations or punchings having a plurality of peripherally spaced inwardly opening slots such as 15 and 29 for receiving the coils. The coils include illustrative conductor turns as is well known and parts of which are shown as 21, 22, 25, 27, 27 in FIG. 1, and 35, 37 and 39 in FIG. 2. The dynamoelectric machines of FIGS. 1 and 2 also include magnetic rotors 32 and 13 disposed with the bore of the stator for rotation therein. A generally uniform annular gap or air space 41 separates the stator cores and the rotors (the relative size of the gap is somewhat exaggerated in FIGS. 1 and 2), and a magnetic field is set up across this gap when the machine is operated.

A comparison of FIGS. 1 and 2 will reveal that, in FIG. 1, conductors such as 21 and 27 improperly are located in the radial air gap 41 between the rotor 32 and stator 10. It is well known in the art to employ slot closure wedges to block the openings of the slots and prevent inadvertent movement of coil turns into the air gap as shown in FIG. 1. Such bore wedges are typically are made of polyethylene terephthalate such as Dupont's MYLAR or similar material and confine the coils within the slots.

In FIGS. 1 and 2 dotted lines 45 depict the magnetic lines of force between the rotors and stators. It will be noted in FIG. 1 that these lines tend to concentrate near the tip 43 of an illustrative stator tooth and to spread therefrom toward the rotor 32. This nonuniformity is due to the fact that the gaps 17 and 19 between adjacent stator teeth effectively is air or other high reluctance material. Such a nonuniform magnetic field in the gap 41 may lead to undesired saturation of portions of the stator, reduce overall efficiency of the machine, and introduce undesirable harmonics in the air gap flux fluctuations. The introduction of slot wedges of conventional plastic type material does not improve these magnetic field problems because the slot opening reluctance remains essentially the same as that for air.

In FIG. 2, the lines of force 45 within the gap 41 are generally uniform. Such uniformity has, in the past, been accomplished, for example, by providing slot wedges formed of stamped sheet metal and coated with an insulative material (e.g., by an extrusion process). Wedges 31 and 33 are formed of a metal filled, glass cloth reinforced laminate fabricated, for example, by a process to be discussed subsequently herein.

Figure 3:
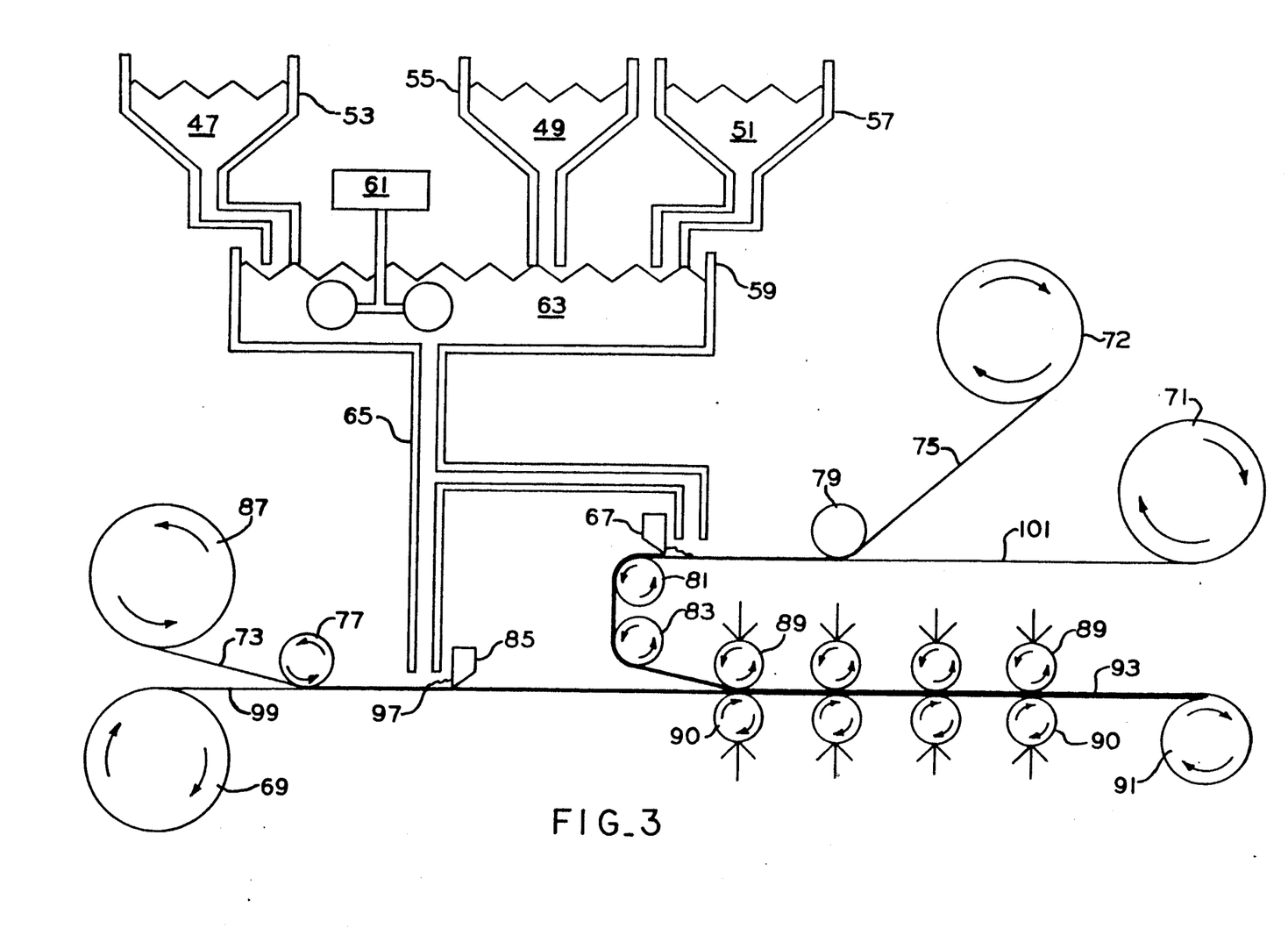
FIG. 3 is a somewhat schematic representation of a portion of a process and apparatus useful for fabricating slot closure wedges embodying the present invention in one form thereof.

With reference to FIG. 3, iron powder 47, a polyester resin 49 and a chemical thickener 51 (MgO in the specific example to follow) are stored in containers 53, 55 and 57 respectively. These are added in desired predetermined percentages to container 59 and thoroughly mixed by mixer 61. After mixing, a resulting iron filled polyester paste 63 is conveyed by conduit 65 and applied to glass cloth strips.

One end of a roll supply of woven glass cloth 87 is taped or otherwise fastened to and fed with a one mil (0.001 inch thick) polyethylene film strip from film strip roll 69. The polyethylene film acts as a support or carrier during the process and helps maintain separation between layers of paste impregnated cloth when it is rolled up later in the process. The glass cloth strip 73 may be a single layer of fabric or multiple layers as desired. In a more preferred embodiment, six plies of Burlington style 3733 30/30 glass fabric are used. The glass fabric and polyethylene backing merge at the guide roller 77 and continue toward a paste application station. The paste is fed from conduit 65 onto the glass cloth in a controlled manner so that a layer is placed on the glass cloth. The slight buildup of paste at 97 is spread uniformly to about 0.062 inches in thickness on the glass cloth by a doctor blade 85. Another supply of glass cloth 72 (like cloth 73) is backed with another polyethylene film 101 (like film 99) from roll 71 and, after passing under the guide or idle roller 79, receives a coating of the paste from conduit 65 which is also spread to a uniform thickness of about 0.062 inches as the superposed strips 75 and 101 pass under doctor blade 67. The paste coated glass fabric and polyethylene film pass around guide rollers 81 and 83 and join with the similarly paste coated glass fabric and polyethylene film from source rolls 87 and 69 (with the paste coated surfaces facing one another) and the thus joined layers pass between a series of pinch rollers at 89 and 90 which squeeze the laminate to promote spreading of the paste and insure that the paste permeates the glass cloth.

Figure 3A:
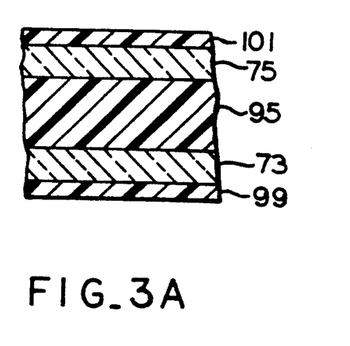
FIG. 3A is an enlarged cross-sectional view of superposed layers of material at an intermediate stage just prior to entering between the pinch rollers in the process of FIG. 3.

FIG. 3A illustrates, in cross-section, an enlarged portion of the superposed strips as they enter between the first set of pinch rollers 89, 90. Here the facing paste layers have merged into a single layer 95, but extensive movement of the paste into the glass cloth layers 73 and 75 is yet to take place. Additional spreading to insure uniform strip thickness and to squeeze the paste into the cloth interstices occurs as the strip passes between the successive pairs of pinch rollers.

Figure 9:
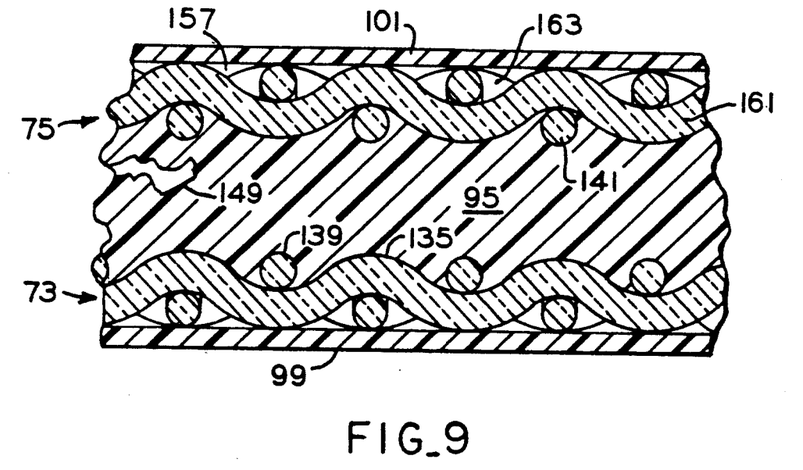
FIG. 9 is an enlarged and exaggerated cross-sectional view of superposed layers of material after having been subjected to some squeezing between the pinch rollers of FIG. 3.
Figure 10:
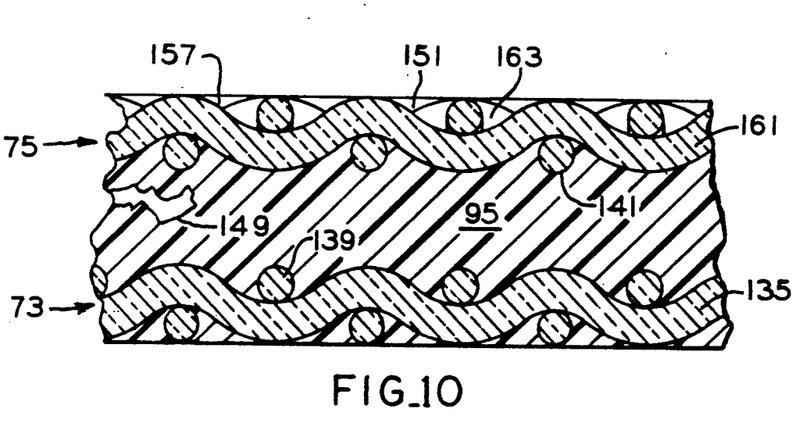
FIG. 10 is an enlarged and exaggerated cross-sectional view of superposed layers of material after having been severed into individual sheets at 105 in the process of FIG. 4.
Figure 11:
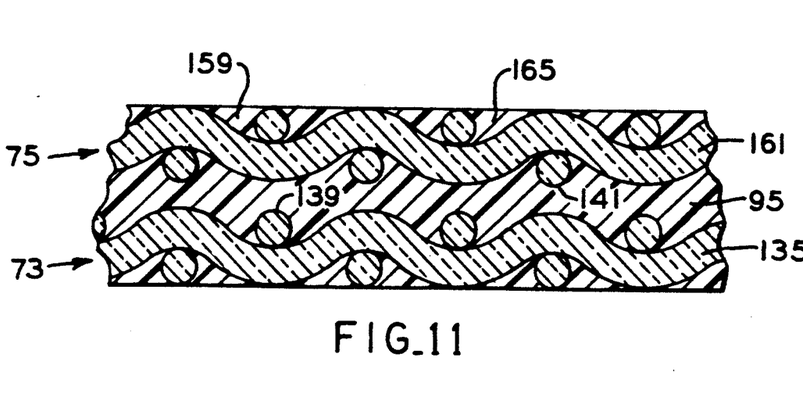
FIG. 11 is an enlarged and exaggerated cross-sectional view of superposed layers of material subsequent to compression molding in the process of FIG. 4.

FIG. 9 depicts in cross-section, an enlarged portion of the superposed strips after they have passed between the first set of pinch rollers 89, 90 and prior to exiting the final set of pinch rollers. In FIGS. 9, 10 and 11, the glass cloth layers 73 and 75 have been simplified and shown as single sheets of "windowscreen" woven relatively large fiber strands 135, 139, 141, 161 and 163 to better illustrate the migration of the paste into the glass cloth, while in actual practice, the fibers would be much smaller and more numerous. In FIG. 9, it will be noted that the paste 95 has moved well into the glass cloth layers, but has not yet penetrated completely through to the faces of the films 99 and 101 in most cases. There may remain illustrative voids such as 157 near the outer protective films where, for example, strand 163 which is not in the plane of the section is still visible behind strand 161, as well as interior voids or air spaces such as 149. Passage between the remaining pairs of pinch rollers will further distribute the paste filling additional ones of the voids such as 157 and reducing the number of instances where strands such as 163 are visible, as seen by comparing FIGS. 9 and 10.

The superposed strips 93 exiting the final set of pinch rollers 89, 90 are then wound about take-up roller 91 and allowed to thicken. Such thickening is not the final polymerization, but, rather, is in the form of an increase in the viscosity of the paste from approximately 20,000 cps at the time of application to approximately $20 \times 10^6$ cps before molding which occurs over a period of several days due to the action of the thickener 51. A conventional sheet molding compound machine with its glass chopping station disabled may be modified and used to implement a portion of the process depicted in FIG. 3.

Figure 4:
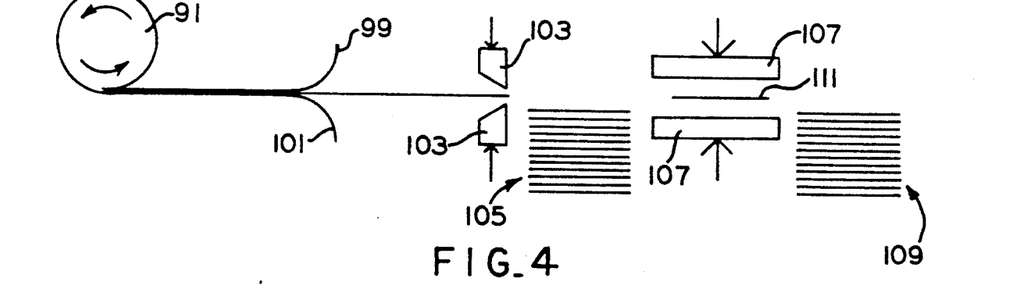
FIG. 4 is a schematic representation of further process steps for fabricating the slot closure wedges of FIG. 2.

After adequate thickening or curing, the roll 91 is payed out as shown in FIG. 4 and the two outside layers of polyethylene film 99 and 101 are stripped off. The remaining polyester paste impregnated glass cloth (typically one-quarter inch in thickness or less) is cut into sheets, typically square and measuring twelve inches on a side, by a pair of cutter blades 103 of, for example, a conventional metal shear, and stacked as at 105 for subsequent processing. Such subsequent processing preferably is in the form of a compression molding between die pieces 107 exerting a force of about 1000 psi. on the composite therebetween to form and finally cure (polymerize) the sheets.

FIGS. 10 and 11 illustrate respectively the comparative cross-sections of the 12 by 12 inch sheets prior to and subsequent to the step of compression molding. FIGS. 10 and 11 each illustrate two sheets of glass cloth 73 and 75 with paste 95 between the sheets as well as generally permeating the woven material of the sheets. Each sheet 73 or 75 is, as noted in the discussion of FIG. 9, illustrated as a "windowscreen" weave with transverse strands 135 and 161, and longitudinal strands 139 and 141, however, in practice several sheets and/or more complex weaving patterns may be used. Despite passage between the sets of pinch rollers 89 and 90, there may, as illustrated in FIG. 10, remain paste-free regions or voids such as 149 between the glass cloth layers and voids such as 151 and 157 where the paste has failed to completely saturate the glass cloth. Such voids are typically located near the edges of the sheets. Compression molding tends to fill in these few remaining voids. Comparing FIGS. 10 and 11, it will be observed that in FIG. 11, strand 163 has become obscured by paste 159 and 165 filling the voids 151 and 157. Prior to compression molding, the sheets in stack 105 are, as illustrated in FIG. 10, about 0.200 inches in thickness while the sheets in stack 109 subsequent to the compression molding step are, as shown in FIG. 11, about 0.125 inches in thickness. This thickness reduction is accompanied by a primarily lateral flow of the paste to completely fill any voids such as 149 in the region between the glass sheets, along with some flow to completely permeate the glass cloth eliminating voids such as 151 and 157, and, perhaps, some overflow or flash at the edges. Such flash has been found to be small, perhaps one part in eighty, and may simply be discarded.

The polyester is a thermosetting material and is cured or polymerized by heat and pressure. Curing time is about two minutes at a temperature of about 300 degrees Fahrenheit for a pressure of about 1000 psi. At this point in the process, a strong magnetic field may be applied to the composite if it is desired to create a permanent magnet, however, selection of a more appropriate ferromagnetic material than the iron powder 47 would be preferable. The cured sheets in stack 109 may be subsequently machined as desired into their final form. Any of the commonly encountered devices for machining metals may be used to perform similar machining tasks on the cured sheets.

Figure 5:
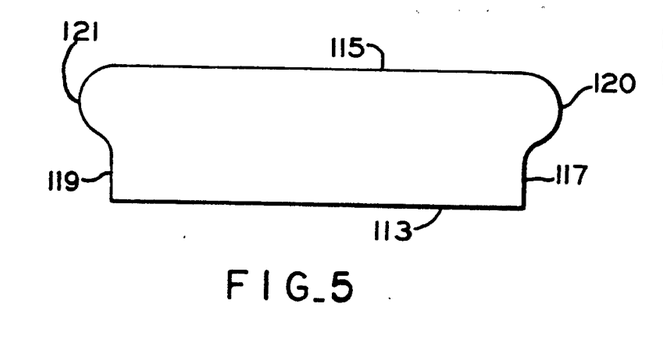
FIG. 5 illustrates the configuration of a stator bore wedge of uniform cross-section produced in accordance with the present invention in another form thereof.
Figure 6:
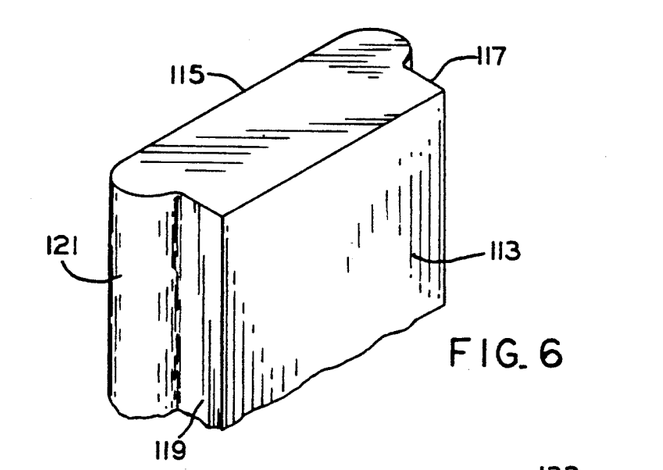
FIG. 6 is a partial perspective view of one of the wedges of FIG. 2.
Figure 7:
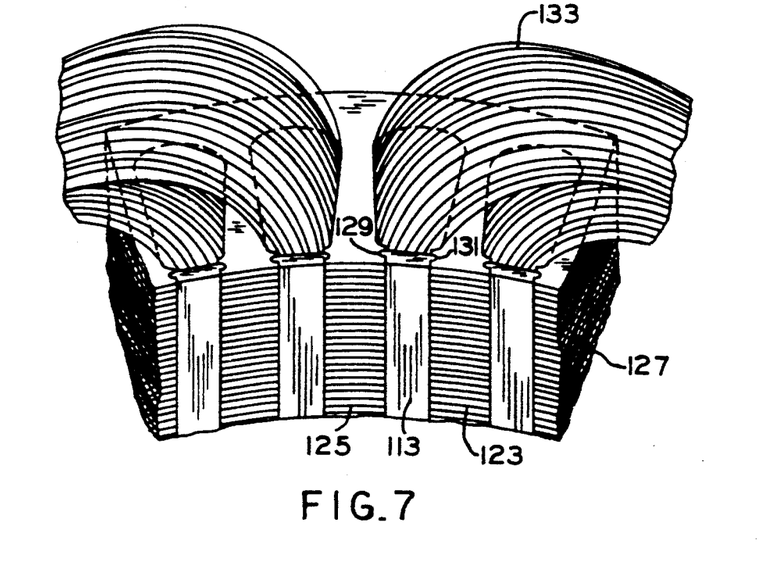
FIG. 7 is a partial perspective view of part of a motor or generator embodying the invention in yet another form.

One preferred final form is the stator slot closure wedge illustrated in FIGS. 5 and 6. The individual sheets in the stack 109 may first be surface machined to smooth the surfaces 113 and 115, and to insure that these surfaces are generally parallel. As noted earlier, the composite material is easily machined and almost any type of known metal working device may be used in the forming and machining of these sheets. The sheet is then cut into elongated strips of generally uniform cross-section using a simple metal shear. Typically, the cut strip cross-sectional configuration is rectangular (or trapezoidal if the shear blade introduces a slight taper along the cut edge) with the smooth opposed flat surfaces forming two opposed elongated surfaces 113 and 115 of each strip. The opposed edge convex radii 120 and 121 and the opposed parallel edge surfaces 117 and 119 are then cut into the edges of the strips by a conventional router. The thus contoured wedge edges fit snugly between complementarily contoured sides of adjacent stator tooth tips as best seen in FIG. 7. The wedge of FIG. 5 is of uniform cross-section and may be about one-tenth inch thick, four-tenths of an inch in width and of a length corresponding to the length of the core to which it is to be applied. The opposed convex surfaces 120 and 121 are preferably of about three-tenths of an inch in radius.

Wedges as shown in FIGS. 5 and 6 have been inserted between adjacent stator teeth such as 123 and 125 of the stator core 127 of FIG. 7 to provide greater uniformity of magnetic field in the gap between the stator and rotor as discussed earlier in conjunction with FIG. 2. In the typical fabrication of stator cores, individual laminations are punched from sheet or strip stock and subsequently stacked one upon another to form a stator core. The die which punches the laminations for stator core 127 may include arcuate portions for forming the pairs of facing concavities such as 129 and 131 in adjacent tooth tips for receiving the arcuate portions 120 and 121 of the slot closure wedges. After the side turn portions of windings such as winding 133 have been positioned in their respective stator core slots, a slot closure wedge is slid axially into the gap between a pair of adjacent stator teeth to secure the side turn portion of the winding in place within the slot and to significantly reduce the reluctance of the region between those adjacent teeth. The complementarily contoured wedge edges and stator tooth tips insure an accurate fixed radial positioning of the wedge in the stator.

Figure 8:
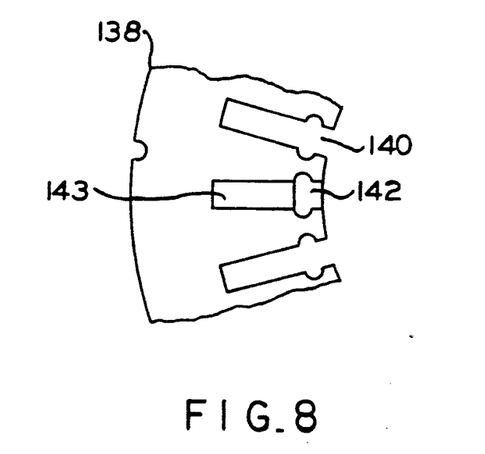
FIG. 8 is a view of an illustrative wedge as in FIG. 6 deployed in a stator core of a type for receiving formed coils (coils not shown)

FIG. 8 shows a preferred application of the slot closing wedge of FIGS. 5 and 6. In motor or generator design where space and particularly stator core slot space is precious, the coils are sometimes formed from conductors which have a square or rectangular cross-sectional configuration. This shape eliminates the air spaces inherently formed between coils of circular cross-sectional configuration and allows packing of a specified number of turns of specified conductor size into a smaller slot leaving a maximum amount of iron in the stator. FIG. 8 illustrates a parallel sided open slot profile for receiving one or more rectangular conductors. It is known that, in comparison to semi-closed or closed slot profiles, this slot shape facilitates winding placement at the expanse of an increase in gap reluctance and high frequency no-load tooth loss. It has been suggested that these effects may be ameliorated by using so-called "semi-magnetic" slot wedges. The particular stator 138 shown in FIG. 8 has 72 generally rectangular slots such as 140 and 143 equally spaced about an approximately 15 inch bore. One illustrative slot closing wedge 142 is illustrated in position closing the slot 143. The coils designed to fill rectangular slots of this type are known as "formed coils" and are most commonly encountered in relatively large integral horsepower dynamoelectric machines.

The following examples illustrate suitable components in percentage by weight which have been employed in accordance with the apparatus and technique illustrated in FIGS. 3 and 4 to implement the method and provide example of slot closure wedges heretofore described.

EXAMPLE I

Glass Cloth: 12.3% Burlington type 3733 30/30 glass fabric; UM 728 finish; for providing reinforcement

| Paste: | 68.8% | Hoeganaes 230 Fe powder (atomized) |
| --- | --- | --- |
| | 16.7% | MR 14067 isophthalic polyester resin, available from Aristech Resins, Inc. |
| | 0.4% | Luperox 500R dicumyl peroxide which functions as the initiator or catalyst |
| | 0.3% | USS MgO liquid-dispersed modifier which functions as a thickening agent, available from Aristech Resins, Inc. |
| | 1.1% | zinc stearate |
| | 0.2% | UC A-I74 organosilane ester which functions as a coupling agent between the glass and the polyester resin |
| | 0.2% | UC VR-3, a viscosity reducing agent |
| Total: | 100.0% | |

One foot square sheets about one-eighth inch thick (final machined dimension) manufactured in accordance with this example exhibited flexural (ASTM D790) and tensile (ASTM D638) strengths of about 27,750 and 16,280 psi respectively at room temperature while the corresponding flexural and tensile moduli were $1.5 \times 10^6$ and $1.62 \times 10^6$ psi respectively. These figures drop significantly as temperature is increased, but do not drop as precipitously as they would if the resin were a thermoplastic material such as a nylon. Again at room temperature, the impact strength of samples from these same exemplary one foot square sheets measured 4.73 foot-pounds per inch by the Izod notch-bar test (ASTM D256).

The percentages in the above Example I were computed based on an assumed paste loss or flash of about 7.7% due to squeeze-out during the compression molding step of FIG. 4. Neglecting the glass reinforcement, the above example contains about 78.45% iron powder, 19.05% polyester resin and 2.5% other components, hence, the ratio of iron to resin is about 4:1. For preferred results, the paste preferably contains at least 75% uniformly distributed powdered iron and the final product (including about 10% glass fabric) preferably has an iron content, by weight, of 60% to 80% with the resin content, by weight, ranging from 15% to 20%. The viscosity of the paste increases as the percentages of iron increases, however, with the addition of a suitable viscosity-reducing agent such as the above noted Union Carbide VR-3, or with the use of a larger mesh glass fabric ratios greater than 4:1 with correlative higher permeabilities may be obtained while adequate electrical insulating properties are retained with no significant increase in eddy current losses. The paste viscosity without viscosity-reducing agents for a 4:1 ratio is about 3041 centipoise at the time of initial application to the cloth, and increases to 6480 centipoise for a 4.5:1 ratio and to 13,200 centipoise for a ratio of 5:1 at the time of application.

EXAMPLE II

Figure 12:
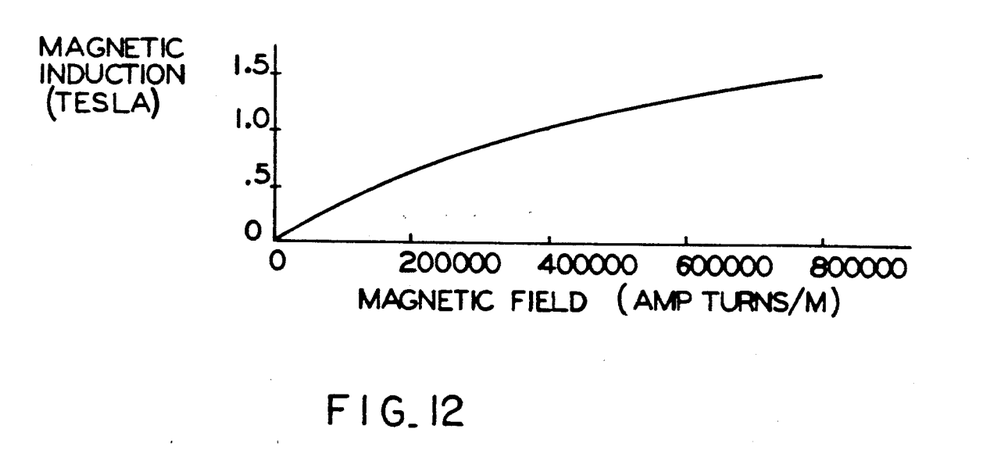
FIG. 12 is a magnetization curve for exemplary bore wedge material.

Example II is the same as Example I except that the VR-3 viscosity reducing agent is omitted, the Luperox catalyst is replaced by a tertiary-butyl perbenzoate. Sheet size was increased to about two by three feet and squeeze-out loss dropped to about 1.25%. Tests on slot closing wedge material made in accordance with this example yielded the magnetization curve of FIG. 12.

From the foregoing, it is now apparent that a novel ferromagnetic material as well as a novel stator slot wedge and technique for fabricating such wedges has been disclosed meeting the objects and advantages features set out hereinbefore as well as others, and that numerous modifications as to the precise shapes, configurations and details may be made those having ordinary skill in the art without departing from the spirit of the invention or the scope thereof as set out by the claims which follow.

What is claimed is:

1. The method of manufacturing an insulating slot wedge for a dynamoelectric machine comprising the steps of:

mixing a powered ferromagnetic material and an uncured polyester resin to form a paste with the ferromagnetic material forming at least 75% of the paste by weight;

impregnating a carrier fabric with the paste;

compression molding the impregnated carrier fabric to form a sheet and to polymerize the resin, the resulting formed and polymerized sheet having a relative permeability in the range of 3 to 5; and machining the formed and polymerized sheet to transform the sheet into an elongated bar having a generally uniform cross-sectional configuration along the length thereof.

2. The method of manufacturing an insulating slot wedge for a dynamoelectric machine as set forth in claim 1 wherein the step of compression molding includes the preliminary steps of superposing a protective layer of inert film on each of the impregnated carrier fabric and squeezing the layer protected impregnated carrier fabric to promote spreading of the paste throughout the fabric.

3. The method of manufacturing an insulating slot wedge for a dynamoelectric machine as set forth in claim 2 including the further preliminary step of cutting the layer protected squeezed impregnated carrier fabric into individual sheets.

4. The method of manufacturing an insulating slot wedge for a dynamoelectric machine as set forth in claim 3 wherein the step of mixing includes the addition of a thickening agent, and further comprising the step of allowing the thickening agent to thicken the paste over a period of time prior to the step of cutting.

5. The method of manufacturing an insulating slot wedge for a dynamoelectric machine comprising the steps of:

mixing a powered ferromagnetic material and an uncured polyester resin to form a paste;

impregnating a carrier fabric with the paste, the ferromagnetic material forming at least 60% by weight of the impregnated carrier fabric;

compression molding the impregnated carrier fabric to form a sheet and to polymerize the resin, the resulting formed and polymerized sheet having a relative permeability in the range of 3 to 5, and machining the formed and polymerized sheet to transform the sheet into an elongated bar having a generally uniform cross-sectional configuration along length thereof.

6. The method of manufacturing an insulating slot wedge for a dynamoelectric machine as set forth in claim 5 wherein the step of compression molding includes the preliminary steps of superposing a protective layer of inert film on side of the impregnated carrier fabric and squeezing the layer protected impregnated carrier fabric to promote spreading of the paste throughout the fabric.

7. The method of manufacturing an insulating slot wedge for a dynamoelectric machine as set forth in claim 6 including the further preliminary step of cutting the layer protected squeezed impregnated carrier fabric into individual sheets.

8. The method of manufacturing an insulating slot wedge for a dynamoelectric machine as set forth in claim 7 wherein the step of mixing includes the addition of a thickening agent, and further comprising the step of allowing the thickening agent to thicken the paste over a period of time prior to the step of cutting.

9. The method of manufacturing an insulating slot wedge for a dynamoelectric machine comprising the steps of:
mixing a powered ferromagnetic material and an uncured polyester resin to form a paste;
impregnating a carrier fabric with the paste;
compression molding the impregnated carrier fabric to form a sheet and to polymerize the resin, the resulting formed and polymerized sheet having a relative permeability in the range of 3 to 5, and an electrical resistivity of at least two ohm-centimeters; and
machining the formed and polymerized sheet to transform the sheet into an elongated bar having a generally uniform cross-sectional configuration along the length thereof.

10. The method of manufacturing an insulating slot wedge for a dynamoelectric machine as set forth in claim 9 wherein the ferromagnetic material forms at least 60% of the impregnated carrier fabric by weight.

11. The method of manufacturing an insulating slot wedge for a dynamoelectric machine as set forth in claim 9 wherein the step of compression molding includes the preliminary steps of superposing a protective layer of inert film on each side of the impregnated carrier fabric and squeezing the layer protected impregnated carrier fabric to promote spreading of the paste throughout the fabric.

12. The method of manufacturing an insulating slot wedge for a dynamoelectric machine as set forth in claim 11 including the further preliminary step of cutting the layer protected squeezed impregnated carrier fabric into individual sheets.

13. The method of manufacturing an insulating slot wedge for a dynamoelectric machine as set forth in claim 12 wherein the step of mixing includes addition of a thickening agent, and further comprising the step of allowing the thickening agent to thicken the paste over a period of time prior to the step of cutting.

* * * * *